Figure 1:
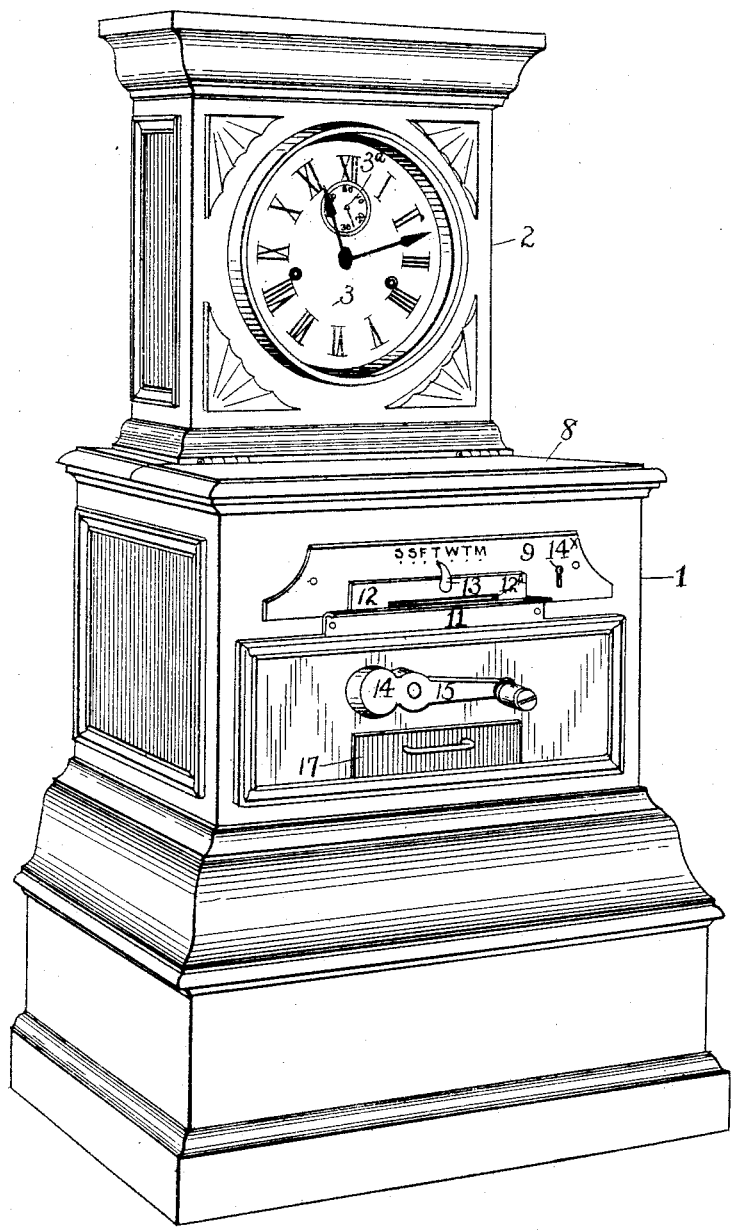

No. 830,486. PATENTED SEPT. 4, 1906.
H. B. PALMER.
AUTOMATIC TIME RECORDER.
APPLICATION FILED NOV. 3, 1904.

5 SHEETS—SHEET 1.

Witnesses
Inventor
Harry B. Palmer
By his Attorney

No. 830,486. PATENTED SEPT. 4, 1906.
H. B. PALMER.
AUTOMATIC TIME RECORDER.
APPLICATION FILED NOV. 3, 1904.

5 SHEETS—SHEET 2.

Witnesses
R. Champion
C. A. Underhill

Inventor
Harry B. Palmer
By his Attorney

THE NORRIS PETERS CO., WASHINGTON, D. C.

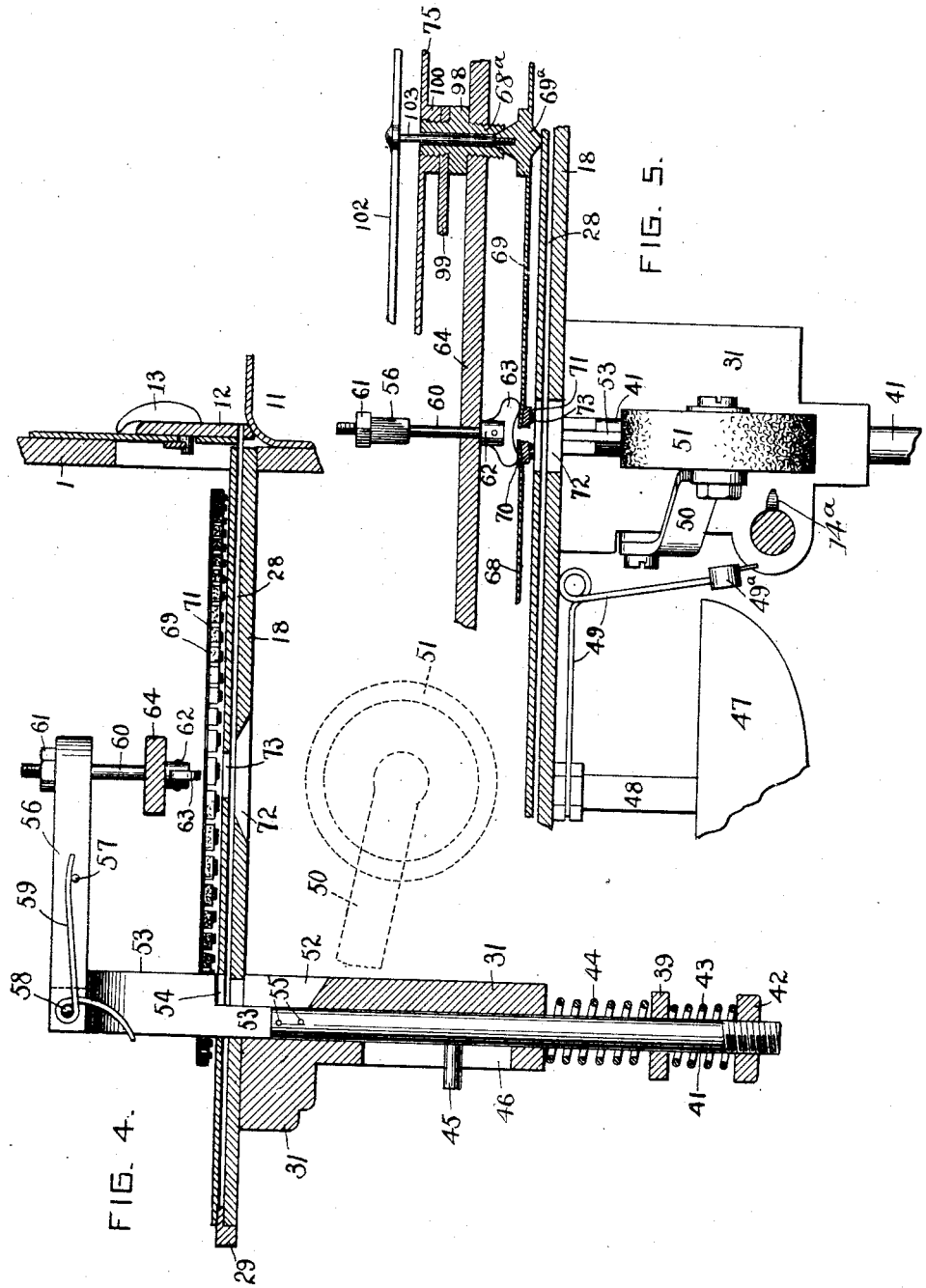

No. 830,486. PATENTED SEPT. 4, 1906.
H. B. PALMER.
AUTOMATIC TIME RECORDER.
APPLICATION FILED NOV. 3, 1904.

5 SHEETS—SHEET 4.

Witnesses
R. O. Lampin
C. R. Underhill

Inventor
Harry B. Palmer,
By his Attorney

THE NORRIS PETERS CO., WASHINGTON, D. C.

No. 830,486. PATENTED SEPT. 4, 1906.
H. B. PALMER.
AUTOMATIC TIME RECORDER.
APPLICATION FILED NOV. 3, 1904.

5 SHEETS—SHEET 5.

Witnesses
R. Champion
C. R. Underhill

Inventor
Harry B. Palmer,
By his Attorney

UNITED STATES PATENT OFFICE.

HARRY B. PALMER, OF NEW YORK, N. Y.

AUTOMATIC TIME-RECORDER.

No. 830,486.   Specification of Letters Patent.   Patented Sept. 4, 1906.

Application filed November 3, 1904. Serial No. 231,196.

*To all whom it may concern:*

Be it known that I, HARRY B. PALMER, a citizen of the United States, and a resident of New York, in the county of New York and State of New York, have invented certain new and useful Improvements in Automatic Time-Recorders, of which the following is a specification.

This invention relates to improvements in automatic time-recorders, and especially to that class of time-recorders in which each employee has an individual card on which his time is recorded when the card is inserted in the machine, the present application being a renewal of that filed by me March 9, 1903, Serial No. 146,936.

The principal object of this invention is to provide an improved time-recorder of this class in which a time-card or blank is positioned in two directions corresponding, respectively, to different days of the week and to different periods of each day by mechanism coöperative with elements carried by a time-card itself. These elements constitute means for determining the relative positions of a time-card and the recording mechanism which is intended to make a record thereon and are herein termed "feed-indicators," as they serve to indicate the extent of such relative feed movement. These feed-indicators may be of any suitable type and may be formed in various ways; but preferably they are feed-openings or feed-notches and are formed by the automatic time-recorder substantially at the time a record is made on the card by the time-recording mechanism of the machine. The principal feature which distinguishes this part of the present invention from corresponding mechanisms of other automatic time-recorders is the provision of means for forming in a time-card or blank feed-indicators or feed-openings corresponding not only to different periods of a day, but also to different days of the week, these feed-indicators or feed-openings being usually formed by blank-cutting mechanism which operates to notch a time-card or blank in two directions, usually lengthwise and crosswise thereof, the feed-openings running in one direction representing or corresponding to different periods of a day, while those running in the other direction represent or correspond to different days of the week. A mechanism capable of coöperating with, and especially one capable of forming, feed-indicators or feed-openings of this kind constitutes a means for checking in two ways the fact that the machine has been operated by an employee, one of these checks—to wit, the feed-indicator—serving to prevent the making of a time-record in any space other than that which corresponds to the position of such feed-indicator.

Another important feature of this invention is the provision of independently-movable types for making the time-records, these types being selected or positioned by suitable time-controlled mechanism. The preferred way in which these types are made independently movable is by mounting them on spring-arms or tongues constituting elements of disk-like rotary members capable of rotating the types collectively to position them one after another adjacent to the printing-point while permitting the positioned types to move in a direction substantially parallel with the axis of rotation for the purpose of impressing a blank or time-card. When the types are mounted in this manner, they may be placed and operated in substantially the same manner as the wheels of the time-train by which they are controlled, and the axis of movement of the type-carrier will be substantially perpendicular to the plane of each type-face instead of being substantially in parallelism therewith, as in the ordinary types of recording mechanisms used in automatic time-recorders.

Other features of this invention not hereinbefore referred to will be hereinafter described and claimed, and are illustrated in the accompanying drawings, in which—

Figure 2:
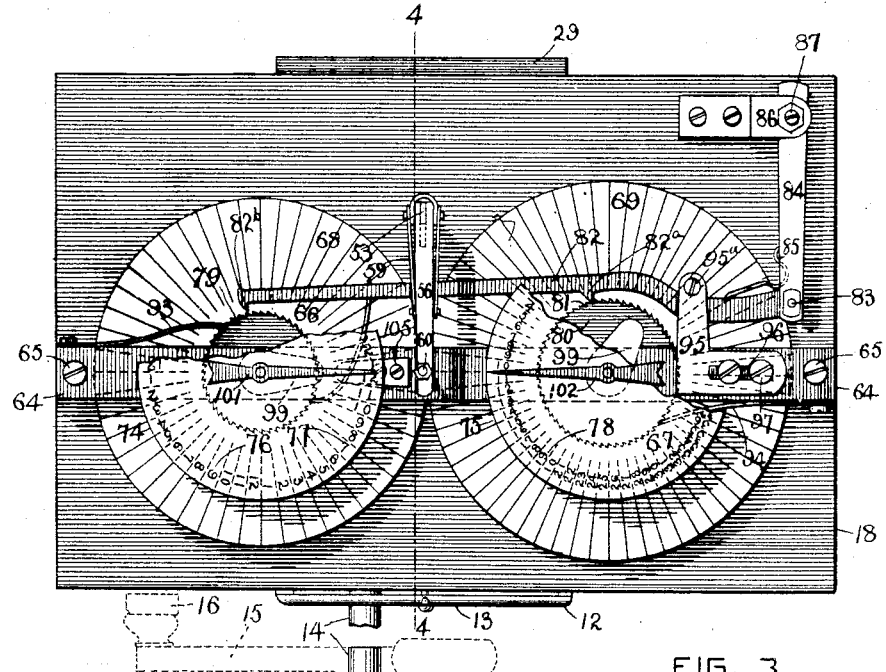
Figure 3:
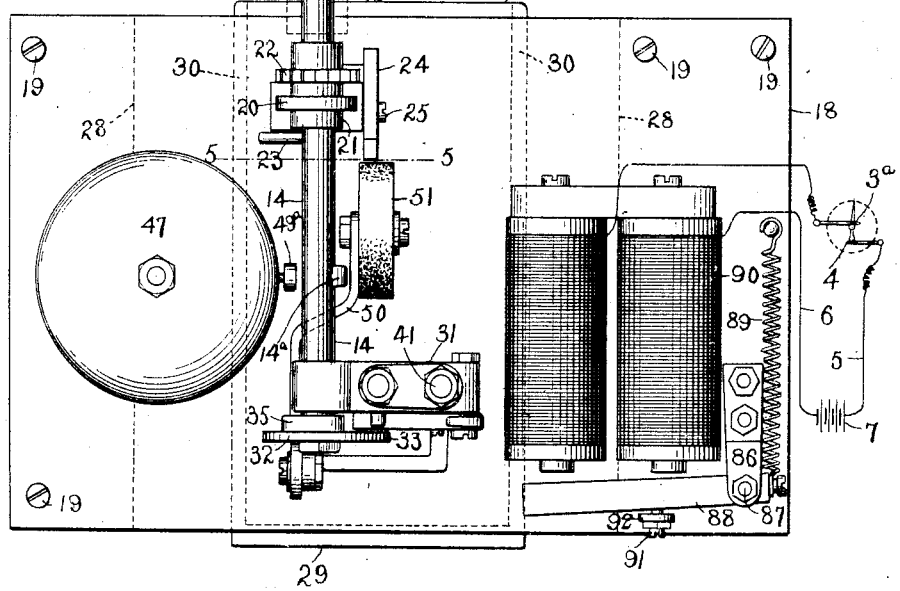
Figure 6:
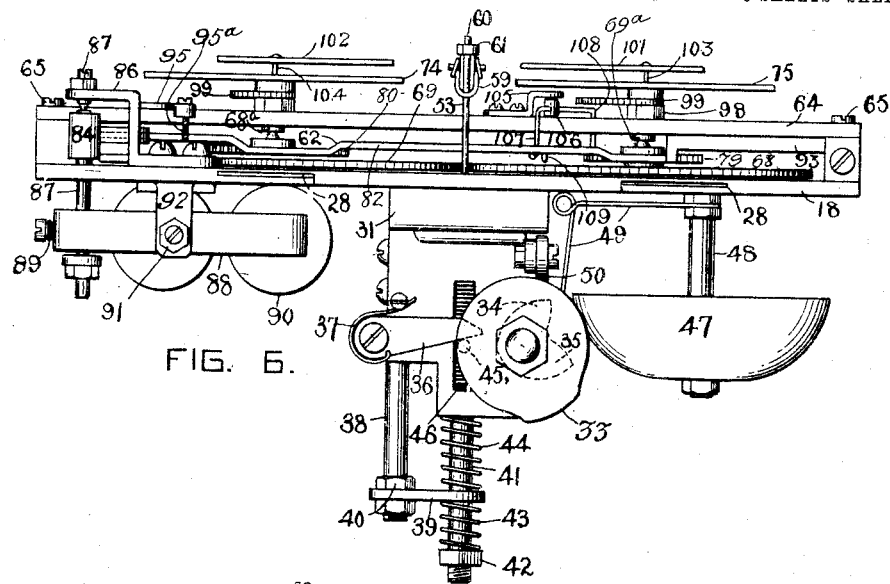
Figure 7:
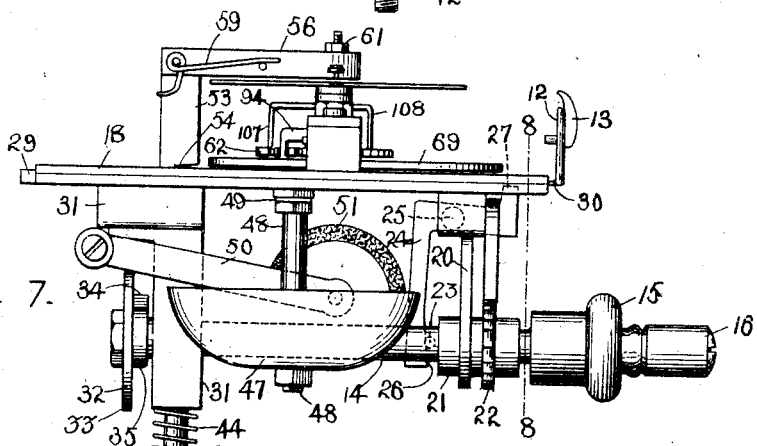
Figure 8:
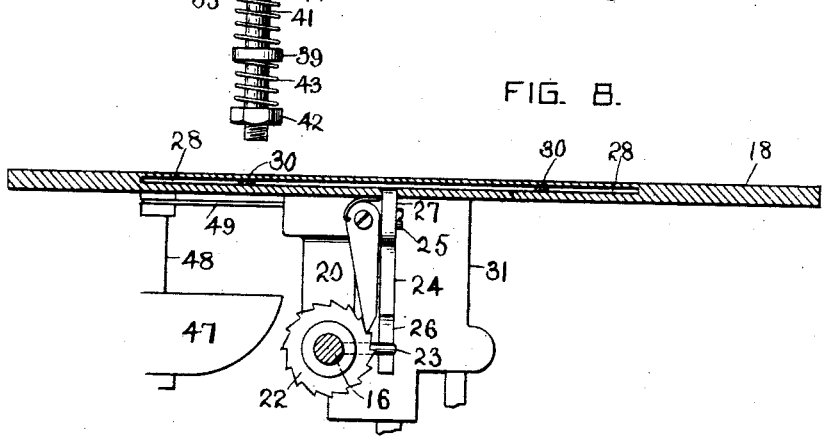
Figure 9:
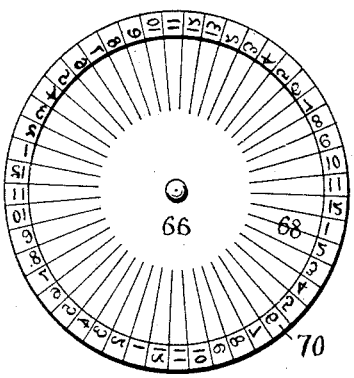
Figure 10:
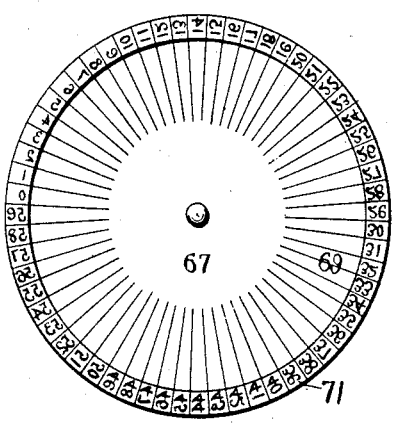
Figure 11:
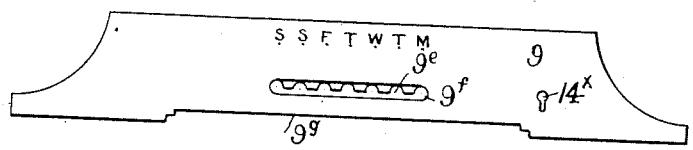
Figure 12:
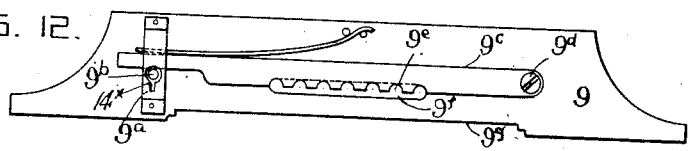
Figure 13:
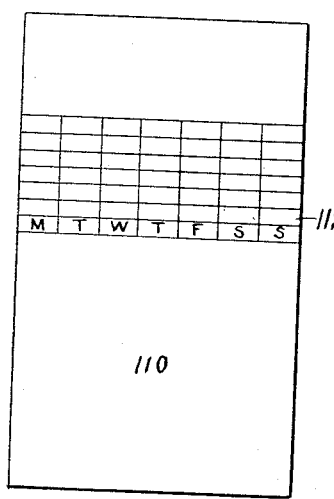
Figure 14:
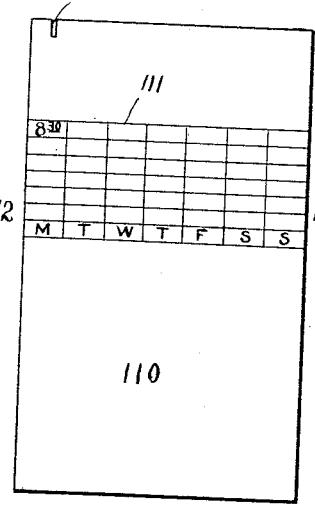
Figure 15:
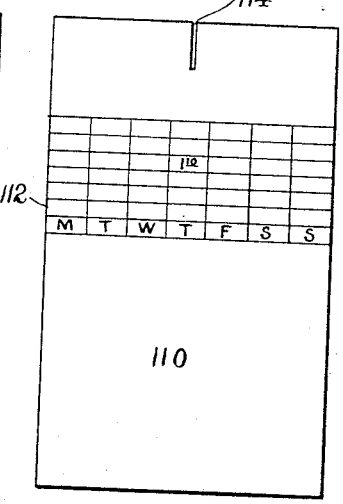

Figure 1 is a perspective view of an automatic time-recorder embodying this invention. Fig. 2 is a plan view of a part of the printing mechanism thereof. Fig. 3 is an under side view of a portion of the machine, showing portions of the inking means and electric time-controlling mechanism. Fig. 4 is an enlarged central vertical section upon the line 4 4 of Fig. 2 looking in the direction of the arrow. Fig. 5 is an enlarged sectional detail upon the line 5 5 of Fig. 3. Fig. 6 is a rear elevation of the mechanism shown in Figs. 2 and 3. Fig. 7 is a side elevation of the same. Fig. 8 is a sectional detail, the section being taken upon the line 8 8 of Fig. 7 looking in the direction of the arrow. Figs. 9 and 10 are plan views of revoluble members carrying the type-ordinals. Figs. 11 and 12 are details which will be hereinafter described. Fig. 13 represents one of the blanks upon which an employee's time is to be kept, and Figs. 14 and 15 show blanks having different time-records and different feed-indicators.

The main casing 1 is surmounted by a clock-casing 2 containing a clock 3. The second-spindle $3^a$ of the clock is provided with a circuit-closing device adapted to close a break in an electric circuit, which includes a contact 4, connected by wires 5 and 6 with a battery 7 and with a magnet 90, as hereinafter described. A hinged door 8 is provided for permitting access to the mechanism. Upon the front of the machine-casing 1 is a plate 9, the rear face of which carries a bracket $9^a$, having therein a central hole $9^b$ for engaging the stem of a key. Mounted upon this plate is a latch $9^c$, pivoted at $9^d$ and provided with notches $9^e$, which register with the slot $9^f$, as indicated particularly in Fig. 12. The plate is also provided with a larger slot $9^g$ at its bottom. Upon the front of this plate opposite the notches $9^e$ are characters representing the several days of the week, as indicated particularly in Fig. 11. Mounted also upon the front of the casing is a shelf 11 for the purpose of supporting the front end of a time-card or blank as the same is inserted through a slot $12^a$. A movable plate 12 is provided with a pointer 13 and with a slot $12^a$, narrower than the slot $9^g$. The plate 9 has a keyhole $14^x$, through which a key may be inserted, the shank of the key entering the hole $9^b$ of the bracket $9^a$. (See Fig. 12.) By turning the key the latch $9^c$ will be lifted slightly, so that the plate 12 may be shifted laterally to such an extent that the pointer 13 will indicate a different day of the week. The key of course is accessible only to some officer or employee who is held accountable for the proper positioning of the pointer. On Monday morning the indicator or pointer 13 should be placed immediately under the letter "M" to the right. With the machine in the condition indicated in Fig. 1 Thursday is the day upon which the machine is being used.

A rotary spindle 14, provided with a crank 15, having a handle 16, is turned by each employee for the purpose of recording his individual time. A removable drawer 17 may be employed for the purpose of receiving accumulated fragments cut from the cards, as hereinafter described. A horizontal plate 18, preferably held in position by screws 19, is mounted centrally within the casing 1. A bearing-bracket 20 depends from this plate and supports the hub 21 of the shaft 14, as indicated particularly in Fig. 3. A ratchet 22 and an arm 23 are fixed upon the shaft, so as to be rotatable therewith. A dog 24 is pivoted at 25 for the purpose of preventing the entry of cards into the machine until the printing apparatus has been inked. The dog 24 has a beveled face 26 and a tooth or stop 27, which normally projects upwardly, as indicated in Fig. 7. The plate 18 has a broad slot 28, (see Fig. 7,) and into this slot the stop 27 of the dog 24 is free to move when the dog is actuated by its own weight. Each turn of the handle 16 causes the arm 23 to move downward upon the beveled face 26, as indicated in Fig. 7, thereby causing the stop 27 to be momentarily withdrawn from the slot. This withdrawal occurs when the handle is in the position indicated in Figs. 1 and 7. The card or blank should, therefore, be inserted while the handle is in this position. In fact, it cannot be inserted when the handle is in any other position, because of the obstruction of the slot 28 by the stop 27.

The plate 12 is rigidly connected by means of longitudinal bars 30 with a bar 29 parallel with the rear edge of the plate 18. The plate 12, the bars 30, and the bar 29 therefore constitute a rigid frame for guiding the cards into position. This frame is movable laterally to the right or to the left and is controlled by the position of the plate 12. In other words, when the plate 12 is moved the entire frame, consisting of the four parts mentioned, is shifted to the right or to the left, as the case may be.

Rigidly connected with the plate 18 and depending therefrom is a bracket 31 for supporting several of the movable parts. Mounted upon the shaft 14 is a cam-wheel 32, having a cam 33. Smaller cams 34 and 35 are also carried by said shaft. A lever 36 is provided with a spring 37 for normally maintaining it in the position indicated in Fig. 6 and is periodically engaged by the cams 34 and 35. Upon a depending rod 38 is rigidly mounted a bracket 39, secured thereto by means of nuts 40. A rod 41, carrying at its lower end a stop-nut 42, is mounted to slide within this bracket, and at opposite sides of said bracket are springs 43 and 44 for tensioning the rod 41. A pin 45 is carried by the rod 41 and projects through a slot 46, as indicated in Fig. 6. Upon each depression of the lever 36 by either of the cams 34 and 35 the rod 41 is carried momentarily downward, and its movements in both directions are resisted by the springs 43 and 44. A bell 47 is mounted upon a depending stem 48 and is provided with a spring 49, carrying a clapper $49^a$. A lever 50 carries an inking-roller 51 and is periodically engaged by the cam 33 of the cam-wheel 32, so that the inking-roller 51 is at intervals forced momentarily upward.

The bracket 31 is provided with a slot 52, through which cut pieces of cards may fall, and the rod 41 is mounted to slide in the bracket 31, as above explained. A flat bar 53, having a cutting edge 54, is secured, as by means of rivets 55, upon the upper end of the rod 41, as indicated in Fig. 4. Upon the upper end of the flat bar 53 is a head 56, having a stop 57, this head being pivoted about the axis 58 and yieldingly mounted, it being normally pressed downward by means of a spring 59, one end of which bears against the stop 57. Rigidly connected with the head 56 and adjustable relative thereto by means of the nut 61 is a thrust-rod 60, having at its lower end a head 62, carrying a presser-foot 63 of the shape indicated in Fig. 5.

Mounted upon the plate 18 and spaced therefrom is a bridge-bar 64, through which the thrust-rod 60 is free to slide. The bridge-bar is secured in position by means of screws 65, which pass through the same and engage the plate 18. Mounted between the plate 18 and the bridge-bar 64 are rotary disks 66 and 67, having radially-disposed spring-tongues 68 and 69, these tongues being provided at their outer ends with types 70 and 71, representing the time-ordinals to be printed. The portion of the plate 18 above the slot 28 is provided with an aperture 73 of the shape indicated in Figs. 4 and 5, and the portion of the plate 18 below the slot 28 is provided with an aperture 72, which is of the shape indicated in Figs. 4 and 5, for the purpose of admitting the upper surface of the roller 51, as indicated by dotted lines in Fig. 4. Dials 74 and 75 are fixedly connected with the bridge-bar 64, the dial 74 being provided with four distinct groups of ordinals 76 77, printed in light or heavy type, respectively, for the purpose of distinguishing between day-time and night-time. The ordinals 76 and 77 represent hours. The dial 75 is provided with ordinals 78, these ordinals representing minutes, and therefore being sixty in number. Rigidly connected with the rotary disks 66 and 67 are ratchet-wheels 79 and 80, the ratchet-wheel 80 having a deep notch 81.

A movable arm 82 operates simultaneously a pair of actuators or pawls 82$^a$ 82$^b$ for the purpose of turning the respective ratchet-wheels 79 and 80. This arm 82 is pivoted at 83 upon the arm 84 and is normally pressed downward by means of a spring 85. A bracket 86 is mounted upon the plate 18, and the arm 84 is free to swing relatively thereto. This arm 84 is rigidly connected with a rocking pivot 87, which passes directly through the plate 18 and is connected rigidly to an armature 88, by which motion is communicated to the arms 84 and 82. The armature 88 is tensioned by a spring 89 and is actuated by the electromagnet 90. By means of adjustable screws 91, mounted in a stationary bracket 92, the movement of the armature may be adjusted as desired. The ratchets 79 and 80 are prevented from rotating backward by means of spring-pawls 93 and 94.

Mounted upon the bridge-bar 64 is a bracket 95, having a stop 95$^a$, which engages the movable bar 82. This bracket is provided with a slot 96, through which pass adjusting-screws 97. By loosening these screws the bracket 95 may be moved to the right or to the left for the purpose of adjusting the arm 82. When the bracket is moved to the left, the stop 95$^a$ depresses the arm 82, causing the pawls 82$^a$ and 82$^b$ to be brought close to the ratchets 79 80. The type-carriers' disks 66 67 are mounted upon conical journals 69$^a$, as indicated in Fig. 5. These conical journals work in bearings 68$^a$, which are threaded and provided with lever-nuts 99. The dials 74 75, adjustable by means of the lever-nuts 99, are for this purpose provided with threaded necks 100, which engage the threaded portions of the bearing 98, so that by moving the lever-nuts 99 the dials may be adjusted accurately. The movable hands 101 102 are mounted upon stems 103 104 and are to all intents and purposes analogous to ordinary clock-hands in passing over the dials.

In order to prevent the momentum of the movable disk 66 from carrying the same too far upon each impulse, a bracket 105 is mounted upon the bridge-bar 64, and in this bracket is supported a device for stopping the disk 66. A rotary hub 106, supported by the bracket 105, is provided with arms 107 108, which respectively engage the ratchet-wheel 79 and the movable arm 82. The arms 107 108 are practically integral with the hub 106. The arm 82 is provided with a pin 109, which periodically engages the arm 108, thereby causing the arm 107 to engage the ratchet-wheel 79. For this purpose the free end of the arm 107 is chisel-shaped and serves as a pawl. The rocking of the arm 84 causes the arm 82 to move the ratchet 80 one tooth at each stroke to the right, the pawl 82$^a$ slipping backward over a tooth after each movement of the ratchet-wheel 80. When the ratchet-wheel 80 makes one complete rotation, the pawl 82$^a$ passes into the deep notch 81, thereby allowing the pawl 82$^b$ to extend into a notch of the ratchet-wheel 79, so as to rotate this ratchet to an extent representing one of its teeth. This causes the disk 66 to rotate a distance equal to the distance between the centers of two successive spring-tongues.

By the arrangement just described the disk 67 so moves that the type members 69 are successively brought one at a time under the presser-foot 63, the movements of the tongues being one minute apart, whereas the spring-tongues 68 of the other disk are successively brought beneath the presser-foot at the rate of one each hour. If now the clock 3 be running, the movement of the spindle 3$^a$ closes the break at the contact 4 once every minute and keeps the same closed, say, for a period of three seconds. The battery 7 energizes the electromagnet 90 during the period when the break is closed, and hence the arm 84 actuates the arm 82, and thereby causes the above-described movements of the type-wheels. The hands 101 102, passing over the stationary dials 74 75, indicate at all times the exact moment when the machine is operated. The blank cards 110 upon which the several records of the employees are kept, are printed, preferably, in the form shown in Figs. 13, 14, and 15. Each card has a plurality of rows 111, representing the days of the week, and so designated by the letters "M T W T F S S," as shown in these figures. Each card also has a plurality of rows 112, which run crosswise of the rows 111. The rows 112 represent the different periods at which the time is to be taken, the first space at the top representing the hour of going to work—say 8.30, being indicated in Fig. 4—the next space representing the arrival of the lunch hour, and so on. The feed indicators or notches 113 114 are preferably made by the cutting edge 54 of the flat bar 53 and are of different depths, according to the number of times the particular blank has been inserted in the machine on the same day. The depth of cut made at each insertion is commensurate with the distance apart of the several spaces to be printed. These cards may be made in various ways, as set forth in my companion application filed November 3, 1904, Serial No. 231,197.

The general operation of the machine is as follows: When an employee comes to work in the morning, he takes a card, such as shown in Fig. 13, and then turns the crank 15 by means of the handle 16 into the position indicated in Fig. 1. This movement of the handle causes the shaft 14 to rotate from whatever position it may occupy to that indicated in Fig. 3. The arm 23 now holds the dog in the position shown with the stop 27 withdrawn from the slot 28. The movement of the handle into this position also causes the rotation of the cam 32, so that the cam 33 causes the lever 50 to be lifted momentarily, thus bringing the ink-roller 51 into the aperture 72. (See Fig. 4.) The same partial rotation of the shaft 14 causes the cam 34 (see Fig. 6) to rock the lever 36, thereby momentarily depressing the rod 41 and bringing down the presser-foot 63 (see Fig. 5) upon the spring-tongues 68 69, carrying the type 70 71. This forces the type 70 71 down through the aperture 73 and into engagement with the inking-roller 51. The card is now inserted. If the card be a new one, as indicated in Fig. 13, its edge is simply brought into contact with a fixed stop, here shown as the edge of the flat bar 53, immediately below the cutting edge 54 of said bar. This is done after the cam 34 releases the lever 36, and consequently after the types have been raised out of the opening 73, as indicated in Fig. 5, the types having already been inked by the process above stated. The card having been inserted, the handle 16 is now rotated further in the same direction, the dog 24 (see Fig. 7) is released, and the stop 27 rests lightly against the under side of the card, being ready to obstruct the slot 28 the instant the card is withdrawn. The further rotation of the handle 16 and the shaft 14 causes the cam 35 (see Fig. 6) to engage the lever 36, thus depressing the same for the second time and causing the second descent of the rod 41. The second descent of this rod takes place while a portion of the card is below the cutting-surface 54. (See Fig. 4.) The card is therefore mutilated slightly, the notch 113 (shown in Fig. 14) being cut therein. This descent of the rod 41 brings down the presser-foot 63 upon the spring-tongues 68 69 and type 70 71, thereby forcing said type into contact with the surface of the card, and thus causing the card to be printed with ordinals representing the hour and minute when the stroke is made. The rotation of the handle 16 also causes the boss 14$^a$ to pluck the clapper of the bell, thereby sounding an alarm, as is customary. The card is then withdrawn. When the noon hour arrives the employee takes the card, which then presents the appearance indicated in Fig. 4, and operates the machine substantially in the manner before described, so as to print another hour and minute in the next succeeding space. If an employee is absent, say, on Tuesday or Wednesday, he will be unable to make his card show any work on the days when he was away, for the reason that the pointer 13 will be in the position indicated in Fig. 1 and the slot 12$^a$ consequently will be in such position that he will be unable so to insert the card as to print any other portion thereof than that intended for Thursday. (See Fig. 15.) Each time the card is used the slots 113 114 are deepened, as indicated in Figs. 14 and 15. If an employee misses a period when he should insert a card and make his record, the next time he uses the card the machine will print upon it the true time of day when he actually inserts it into the machine, and the position upon the card in which the time-record appears will indicate that he has failed to insert the card at the previous time or times when he should have done so.

No adjustment of the machine is necessary to make proper distinction between day-work and night-work, as the time-controlled types automatically make this distinction.

What I claim is—

1. In an automatic time-recorder, the combination with a blank-carrier, of means coöperative with said blank-carrier for forming in a blank feed-indicators corresponding to different days of the week and for also forming in said blank out of alinement with said first feed-indicators other feed-indicators corresponding to different periods of each day and controlling feed movements of said blank.

2. In an automatic time-recorder, the combination with a blank-carrier, of blank-cutting mechanism coöperative with said blank-carrier for making in a blank feed-indicating cuts corresponding to different days of the week and for also making in said blank out of alinement with said first cuts other feed-indicating cuts corresponding to different periods of each day.

3. In an automatic time-recorder, the combination with a blank-carrier, of means coöperative with said blank-carrier for forming in a blank on lines running in different directions feed-indicators for controlling the feed movements of said blank.

4. In an automatic time-recorder, the combination with a blank-carrier, of means coöperative with said blank-carrier for forming in a blank in different lateral and longitudinal positions feed-indicators for controlling the feed movements of said blank.

5. In an automatic time-recorder, the combination with mechanism for forming in a blank in different longitudinal positions feed-indicators for controlling longitudinal feed movements of said blank, of means for effecting a relative lateral movement between said mechanism and a blank for locating said feed-indicators in different lateral positions.

6. In an automatic time-recorder, the combination with blank-cutting mechanism for making in a blank in different longitudinal positions feed-indicating cuts controlling longitudinal feed movements of said blank, of means for effecting a relative lateral movement between said mechanism and a blank for locating said feed-indicating cuts in different lateral positions.

7. In an automatic time-recorder, the combination with blank-cutting mechanism for making in a blank in different longitudinal positions feed-indicating cuts controlling longitudinal feed movements of said blank, and a blank-shifting carrier for moving a blank laterally relatively to said cutting mechanism for locating said feed-indicating cuts in different lateral positions.

8. In an automatic time-recorder, the combination with time-controlled recording mechanism, of mechanism for forming in a blank in different longitudinal positions feed-indicators for controlling longitudinal feed movements of said blank, and means for effecting a relative lateral movement between said mechanisms and a blank for locating said feed-indicators in different lateral positions.

9. In an automatic time-recorder, the combination with time-controlled recording mechanism, of blank-cutting mechanism for making in a blank in different longitudinal positions feed-indicating cuts for controlling longitudinal feed movements of said blank, and means for effecting a relative lateral movement between said mechanisms and a blank for locating said feed-indicating cuts in different lateral positions.

10. In an automatic time-recorder, the combination with time-controlled printing mechanism, of blank-cutting mechanism for making in a blank in different longitudinal positions feed-indicating cuts for controlling longitudinal feed movements of said blank, and means for effecting a relative lateral movement between said mechanisms and a blank for locating said feed-indicating cuts in different lateral positions.

11. In an automatic time-recorder, the combination with time-controlled printing mechanism, of blank-cutting mechanism for making feed-indicating cuts in blanks, and a blank-shifting carrier for moving a blank laterally relatively to said printing and cutting mechanisms.

12. In an automatic time-recorder, the combination with means for locating in any one of a plurality of positions in one direction with respect to a given point a blank having feed-indicators located in different positions in two directions, of means coöperative with said feed-indicators for positioning said blank in the other of said directions.

13. In an automatic time-recorder, the combination with means for locating in any one of a plurality of positions crosswise thereof a blank having feed-indicators located in different positions both lengthwise and crosswise thereof, of means coöperative with said feed-indicators for positioning said blank lengthwise thereof.

14. In an automatic time-recorder, the combination with means for locating in any one of a plurality of positions crosswise thereof a blank having feed-openings located in different positions both lengthwise and crosswise thereof, of means coöperative with said feed-openings for positioning said blank lengthwise thereof.

15. In an automatic time-recorder, the combination of a blank-carrier, means for shifting said blank-carrier to position in one direction a blank having feed-indicators located in different positions in another direction, and means coöperative with said feed-indicators for positioning said blank in said other direction.

16. In an automatic time-recorder, the combination of a blank-carrier, means for shifting said blank-carrier to position in one direction a blank having feed-openings therein located in different positions in another direction, and means coöperative with said feed-openings for positioning said blank in said other direction.

17. In an automatic time-recorder, the combination of means for forming in a blank in different positions in one direction, a blank-carrier, means for shifting said blank-carrier to position a blank in another direction, and means coöperative with said feed-indicators for positioning said blank in said first direction.

18. In an automatic time-recorder, the combination with time-controlled printing mechanism, of a blank-carrier, means for shifting said blank-carrier to position in one direction a blank having feed-indicators located in different positions in one direction, and means coöperative with said feed-indicators for positioning said blank in said other direction.

19. In an automatic time-recorder, the combination with time-controlled printing mechanism, of means for forming feed-indicators in a blank in different positions in one direction, a blank-carrier, means for shifting said blank-carrier to position the blank in another direction, and means coöperative with said feed-indicators for positioning said blank in said first direction.

20. In an automatic time-recorder, the combination of a plate provided with oppositely-disposed apertures and with a slot, a frame mounted within said slot and movable relatively thereto for guiding blanks into predetermined relative positions, flexible members provided with type and free to move into one of said apertures, inking mechanism provided with a movable roller and free to move into the other of said apertures for the purpose of inking said type, and mechanism controllable at will for forcing said type into engagement with the blanks to be printed.

21. In an automatic time-recorder, the combination of printing mechanism, a plate disposed adjacent thereto and provided with a slot and with apertures, time-controlled members movable relatively to one of said apertures, inking mechanism provided with rollers, said rollers being also movable relatively to said apertures, a frame connected with said plate for guiding blank-records relatively to said printing mechanism, and mechanism controllable at will for adjusting said frame relatively to said plate.

22. In an automatic time-recorder, the combination of time-controlled type members and manually-operated mechanism for forcing said type members into engagement with the blanks to be printed, cutting mechanism actuated by said manually-operated mechanism for mutilating different longitudinal portions of said blanks and thereby causing said type members to aline with predetermined longitudinal portions of said blanks, and means for moving said blanks laterally so that said cutting mechanism may act upon different portions of said blanks representing different lateral intervals of time.

23. In an automatic time-recorder, the combination of time-controlled type members, a presser-foot for forcing said type members into engagement with blanks to be printed, a manually-controlled rod for actuating said presser-foot, cutting mechanism connected with said rod for controlling the longitudinal point where the impression takes place upon said blanks, and means for altering the relative lateral positions of said blanks and said cutting mechanism so as to start said cutting mechanism to work upon different lateral portions of said blanks.

Signed at New York, in the county of New York and State of New York, this 14th day of October, A. D. 1904.

HARRY B. PALMER.

Witnesses:
C. S. CHAMPION,
R. CHAMPION.